Oct. 8, 1935.  E. C. THOMPSON  2,016,732
PLANT HOLDER
Filed Nov. 20, 1934
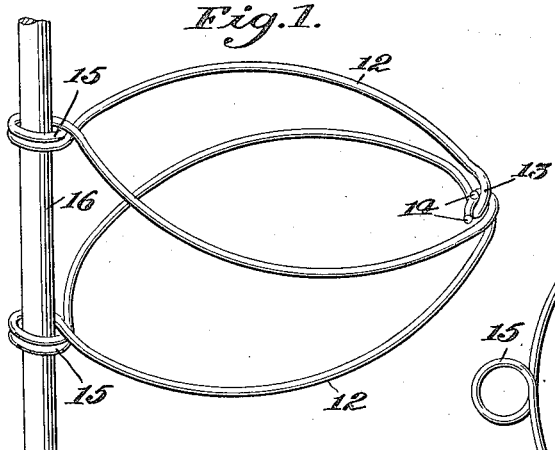
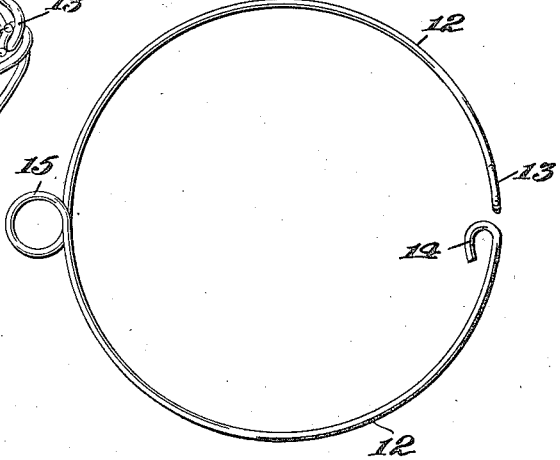
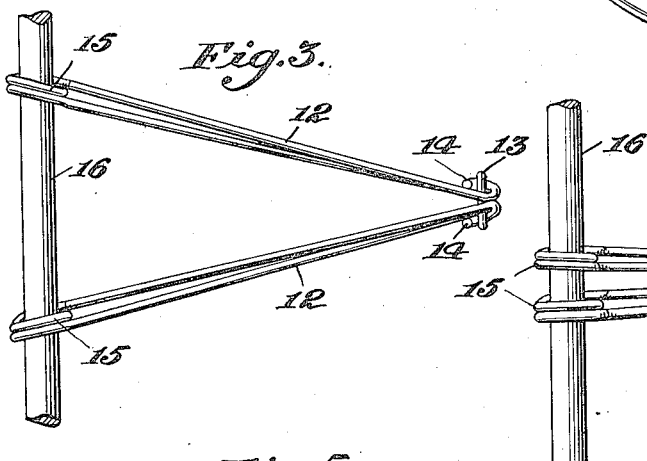
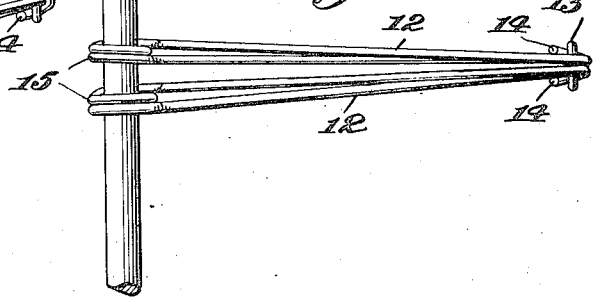
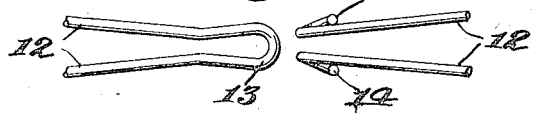
Inventor:
Edward C. Thompson,
by Calvert Calvert
Att'ys.

Patented Oct. 8, 1935

2,016,732

UNITED STATES PATENT OFFICE 2,016,732

PLANT HOLDER

Edward C. Thompson, Bound Brook, N. J.

Application November 20, 1934, Serial No. 753,940

5 Claims. (Cl. 47—47)

The objects of my invention are to provide plant holders which may be easily adjusted as to height above the ground, which may be conveniently placed about the plant to be held, and which, because of the construction, possess ample strength to support plants with heavy foliage.

These objects are effected by the construction hereinafter described and illustrated in the accompanying drawing, in which—

Fig. 1 is a perspective view of the holder locked on a stake in position to support a plant.

Fig. 2 is a plan view of the holder with the bands in open position.

Fig. 3 is a side view of the holder in locked position on a stake.

Fig. 4 is a side view of the holder in position to be adjusted along or up or down on the stake.

Fig. 5 is a detail side view showing the construction of the eye or loop and hooks.

As shown by the drawing the holder consists of two open wire bands 12 for encircling the plant to be supported, the said open bands being connected together at one point of their circumference where the wire of the bands is bent or doubled upon itself to form a loop or eye 13. The free ends of the open bands are formed into hooks 14, for detachable engagement into the loop or eye 13, for closing the open bands.

Diametrically opposite the joining loop or eye 13 each band is bent to form a ring 15 for encircling a stake or rod 16 by which the holder is to be supported. These rings are slightly larger than the stake or rod 16, and when the rings and the bands, with which latter said rings are preferably integral, or to which they may be attached, are forced towards each other, or together, so as to be substantially at right angles to the stake or support, as shown in Fig. 4, the holder may be freely and easily adjusted along or up or down on the stake or support. When the rings are moved apart on the stake and the angles between the stake and the rings and their respective bands become more acute, the rings have a tendency to bind on the stake, thus locking the holder in operative position.

When thus locked in operative position the two bands and the stake form a triangle, as clearly shown in Fig. 3, giving a very strong and rigid construction, much stronger than would be afforded by a single band, depending entirely on the stiffness of the wire for its rigidity and strength.

The two bands, 12, in the construction shown, are formed of a single piece of spring wire which, being doubled on itself at the loop or eye 13, naturally causes the bands to spring apart at the rings 15; so that after adjustment of the stake, with the rings near together, as shown in Fig. 4, the bands naturally spring apart as shown in Fig. 3, at the ring portions thereof, thus automatically assuming binding or locking positions of the rings on the stake, so that, when in operative position, the bands and the stake form a triangle as above referred to.

By disengaging the hooks 14 from the loop or eye 13 the bands may be opened so that the holder may be easily placed about the plant, after which the bands may be closed by engaging the hooks 14 with the loop or eye 13.

The holders may be of different sizes to fit various sizes of plants. Certain proportions and details of construction are shown and described as being simple and satisfactory. The scope of the invention, however, is not limited to these details but covers the broader features set forth in the claims.

Having thus described my invention, I claim and desire to secure by Letters Patent:

1. A plant holder consisting of two open wire bands joined together at one point, each band having a ring for encircling a support, the two bands and the support naturally forming a triangle when said bands are in locked position on said support.

2. A plant holder consisting of a single piece of spring wire formed into two open bands which may be joined together at one point, each band having a ring diametrically opposite the joining point.

3. A plant holder consisting of a single piece of wire formed into two open bands for encircling the plant, said bands being adapted to be joined together at one point in such a manner that said bands may be opened or closed, each band having a ring, diametrically opposite the joining point, for encircling a support, said bands and rings being so arranged or constructed that when the said bands or rings are together the holder may be adjusted along or vertically on the support, and when the bands and rings are separated the holder will be locked on said support.

4. A plant holder consisting of a single piece of spring wire formed into two open bands joined together at one point in the form of an eye or loop, each band having a ring for encircling a stake or support, and each of said bands having a hook adapted to engage said eye or loop to close said bands around a plant to be supported, said bands naturally springing apart to separate said rings, thus automatically locking the holder on the support.

5. A plant holder consisting of a single piece of wire formed into two open plant supporting bands which are joined together at one point in the form of a loop or eye, each of said bands having at its free end a hook to engage said loop or eye, to close said bands around a plant, and each of said bands having a ring to encircle a stake.

EDWARD C. THOMPSON.